US009894569B2

(12) United States Patent
Lee et al.

(10) Patent No.: US 9,894,569 B2
(45) Date of Patent: Feb. 13, 2018

(54) METHOD AND APPARATUS FOR APPLYING ASSISTANCE INFORMATION FOR TRAFFIC STEERING IN WIRELESS COMMUNICATION SYSTEM

(71) Applicant: LG ELECTRONICS INC., Seoul (KR)

(72) Inventors: Jaewook Lee, Seoul (KR); Sunghoon Jung, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 14/780,459

(22) PCT Filed: Apr. 10, 2014

(86) PCT No.: PCT/KR2014/003104
§ 371 (c)(1),
(2) Date: Sep. 25, 2015

(87) PCT Pub. No.: WO2014/168427
PCT Pub. Date: Oct. 16, 2014

(65) Prior Publication Data
US 2016/0044550 A1 Feb. 11, 2016

Related U.S. Application Data

(60) Provisional application No. 61/811,124, filed on Apr. 12, 2013, provisional application No. 61/867,617, filed on Aug. 20, 2013.

(51) Int. Cl.
*H04W 36/00* (2009.01)
*H04W 36/08* (2009.01)
(Continued)

(52) U.S. Cl.
CPC ....... *H04W 36/0066* (2013.01); *H04W 36/08* (2013.01); *H04W 76/046* (2013.01); *H04W 48/08* (2013.01)

(58) Field of Classification Search
CPC ............ H04W 36/0066; H04W 36/08; H04W 76/046
(Continued)

(56) References Cited

U.S. PATENT DOCUMENTS

| 2004/0165563 A1 | 8/2004 | Hsu et al. |
| 2006/0128394 A1 | 6/2006 | Turina et al. |

(Continued)

FOREIGN PATENT DOCUMENTS

| EP | 2557889 A1 | 2/2013 |
| EP | 2953398 A1 | 12/2015 |

(Continued)

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol specification (Release 11)," 3GPP TS 36.331 V11.3.0, Mar. 2013, 345 pages.

(Continued)

*Primary Examiner* — Ronald B Abelson
(74) *Attorney, Agent, or Firm* — Lee Hong Degerman Kang & Waimey

(57) ABSTRACT

A method and apparatus for applying assistance information for traffic steering between a 3rd generation partnership project (3GPP) access network and a non-3GPP access network in a wireless communication system is provided. A user equipment (UE) receives assistance information for traffic steering through a dedicated signaling from an eNodeB (eNB), and starts a timer upon entering an idle mode. The UE applies the assistance information received through the dedicated signaling until the timer expires. After the timer expires, the UE applies assistance information received through a broadcast signaling.

12 Claims, 9 Drawing Sheets

(51) Int. Cl.
*H04W 76/04* (2009.01)
*H04W 48/08* (2009.01)

(58) Field of Classification Search
USPC .......................................................... 370/331
See application file for complete search history.

(56) References Cited

U.S. PATENT DOCUMENTS

| | | |
|---|---|---|
| 2008/0181184 A1 | 7/2008 | Kezys |
| 2012/0113965 A1 | 5/2012 | Puthenpura et al. |
| 2012/0276904 A1 | 11/2012 | Bachmann et al. |

FOREIGN PATENT DOCUMENTS

| | | |
|---|---|---|
| JP | 2006518972 A | 8/2006 |
| JP | 2008523711 A | 7/2008 |
| JP | 2009531891 A | 9/2009 |
| WO | 2014119968 A1 | 8/2014 |

OTHER PUBLICATIONS

Qualcomm Incorporated, "WLAN/3GPP Radio Interworking Scope and Scenarios," 3GPP TSG-RAN2 #81, R2-130264, Jan. 2013, 4 pages.
ETRI, "Requirements for WLAN/3GPP radio interworking," 3GPP TSG-RAN WG2 #81, R2-130331, Jan. 2013, 3 pages.
PCT International Application No. PCT/KR2014/003104, Written Opinion of the International Searching Authority dated Jul. 17, 2014, 1 page.
European Patent Office Application No. 14782593.9, Search Report dated Oct. 27, 2016, 6 pages.

METHOD AND APPARATUS FOR APPLYING ASSISTANCE INFORMATION FOR TRAFFIC STEERING IN WIRELESS COMMUNICATION SYSTEM

CROSS-REFERENCE TO RELATED APPLICATIONS

This application is the National Stage filing under 35 U.S.C. 371 of International Application No. PCT/KR2014/003104, filed on Apr. 10, 2014, which claims the benefit of U.S. Provisional Application Nos. 61/811,124, filed on Apr. 12, 2013 and 61/867,617, filed on Aug. 20, 2013, the contents of which are all hereby incorporated by reference herein in their entirety.

BACKGROUND OF THE INVENTION

Field of the Invention

The present invention relates to wireless communications, and more particularly, to a method and apparatus for applying assistance information for traffic in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc), inter-system mobility policies (ISMP) which is able to reflect operator's policies, and inter-system routing policy (ISRP). Based on the information described above, the UE may determine which IP traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

The MAPCON is a standardization of a technology which enables configuring and maintaining multiple packet data network (PDN) connectivity simultaneously through 3GPP access and non-3GPP access, and enables a seamless traffic offloading in units of all active PDN connections. For this, an ANDSF server provides access point name (APN) information for performing offloading, routing rule, time of day information, and validity area information, etc.

The IFOM supports mobility in a unit of IP flow, which is more flexible and more segmented than the MAPCON, and seamless offloading. The IFOM enables access to different access networks even when the UE is connected to a PDN using the same APN, which is different from the MAPCON. The IFOM also enables mobility in a unit of specific IP traffic flow, not a unit of PDN, for a unit of mobility or offloading, and accordingly, services may be provided flexibly. For this, an ANDSF server provides IP flow information for performing offloading, routing rule, time of day information, and validity area information, etc.

The non-seamless WLAN offloading is a technology that offloads traffics completely so as not to go through the EPC as well as that changes a path of a specific IP traffic to WLAN. The offloaded IP traffic cannot be moved to 3GPP access seamlessly again since anchoring is not performed to the P-GW for mobility support. For this, an ANDSF server provides information as similar as the information provided for the IFOM.

Besides the ANDSF described above, in 3GPP, a method in which a radio access network (RAN) (i.e., base station (BS), radio network controller (RNC)) provides assistance information for traffic steering between 3GPP/WLAN to a UE and the UE performs traffic steering using the received assistance information according to a rule defined by an access stratum standard, for a case that an ANDSF policy is not provided to the UE, has been discussed currently.

The assistance information for traffic steering may be updated depending on overall network situation. However, it is not clear when and how the UE acquires the updated assistance information. Accordingly, a method for handling assistance information effectively is required.

SUMMARY OF THE INVENTION

The present invention provides a method and apparatus for applying assistance information in a wireless communication system. The present invention provides a method for handling assistance information for traffic steering between a 3rd generation partnership project (3GPP) access network and a non-3GPP access network. The present invention provides a method for applying, by a user equipment (UE), assistance information for traffic steering between the 3GPP access network and the non-3GPP access network, which is received by a dedicated signaling, for a specific period of time even after the UE enters an idle mode.

In an aspect, a method for applying, by a user equipment (UE), assistance information for traffic steering between a 3rd generation partnership project (3GPP) access network and a non-3GPP access network in a wireless communication system is provided. The method includes receiving first assistance information for traffic steering through a dedicated signaling from an eNodeB (eNB), receiving second assistance information for traffic steering through a broadcast signaling from the eNB, starting a timer upon entering an idle mode, applying the first assistance information received through the dedicated signaling until the timer expires, and applying the second assistance information received through the broadcast signaling after the timer expires.

The first assistance information may include a time value for the timer which indicates a period of time during which the first assistance information is valid.

The first assistance information may be valid in a cell from which the first assistance information is received.

The method may further include releasing the first assistance information upon determining that the first assistance information is invalid.

It may be determined that first assistance information is invalid when a serving cell is changed.

The serving cell may be changed when handover, cell selection or cell reselection is performed.

The first assistance information may include area information indicating an area in which the first assistance information is valid.

The first assistance information or the second assistance information may include at least one of thresholds regarding the 3GPP access network, thresholds regarding the non-3GPP access network, identifiers of the non-3GPP access network, or traffic routing information.

The first assistance information may be received via a radio resource control (RRC) connection reconfiguration message.

The second assistance information may be received via system information.

The applying the first assistance information may include performing traffic steering from the 3GPP access network to the non-3GPP access network or from the non-3GPP access network to the 3GPP access network based on the first assistance information.

The applying the second assistance information may include performing traffic steering from the 3GPP access network to the non-3GPP access network or from the non-3GPP access network to the 3GPP access network based on the second assistance information.

The method may further include establishing an RRC connection with the eNB after the timer expires, and transmitting the first assistance information and the expiry of the first assistance information upon establishing the RRC connection with the eNB.

In another aspect, a user equipment (UE) in a wireless communication system is provided. The UE includes a radio frequency (RF) unit for transmitting or receiving a radio signal, and a processor coupled to the RF unit, and configured to receive first assistance information for traffic steering between a 3rd generation partnership project (3GPP) access network and a non-3GPP access network through a dedicated signaling from an eNodeB (eNB), receive second assistance information for traffic steering through a broadcast signaling from the eNB, start a timer upon entering an idle mode, apply the first assistance information received through the dedicated signaling until the timer expires, and apply the second assistance information received through the broadcast signaling after the timer expires.

Traffic of UEs in an idle mode as well as traffic of UEs in a connected mode can be steered effectively between a 3GPP access network and a non-3GPP access network.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
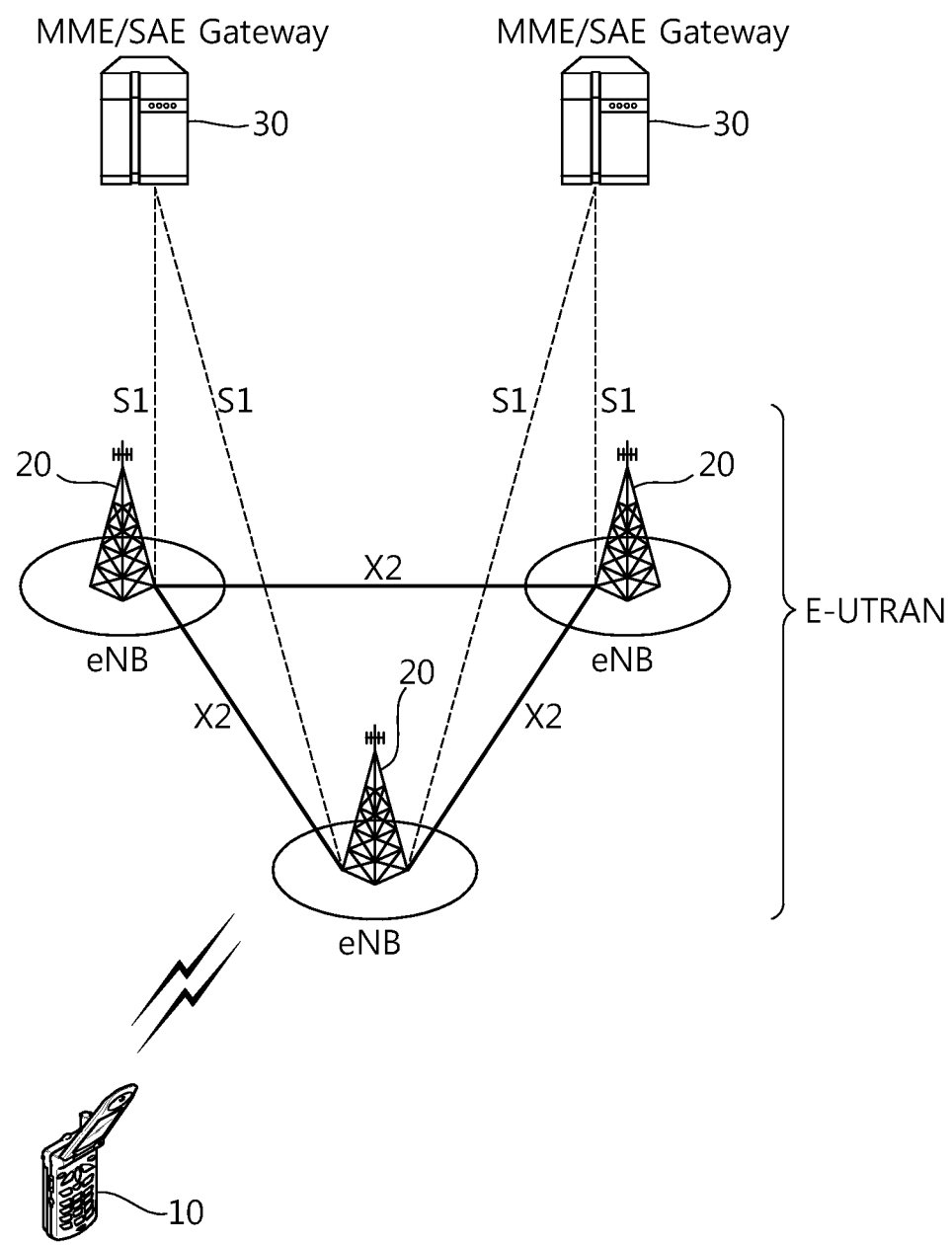
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
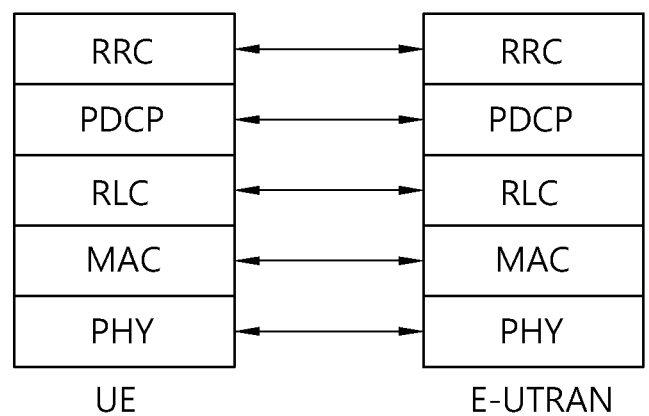
FIG. 2 shows a control plane of a radio interface protocol of an LTE system.
Figure 3:
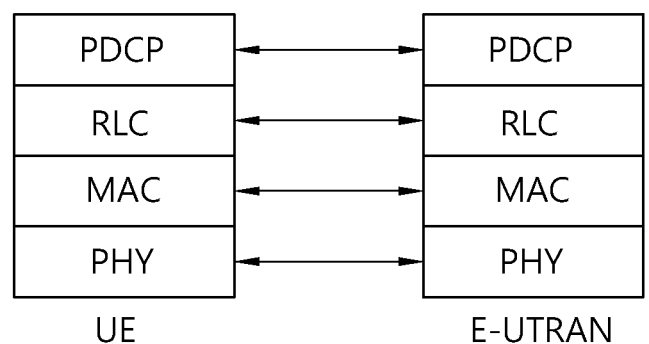
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
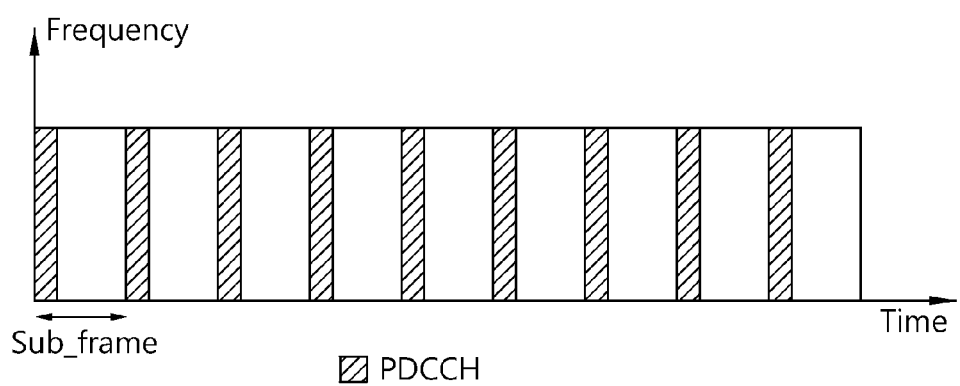
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or Ipv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state (RRC_CONNECTED) and an RRC idle state (RRC_IDLE). When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in RRC_IDLE persistently performs cell reselection to find a better cell. In this case, the UE performs measurement and cell reselection by using frequency priority information. That is, the UE may determine which frequency will be preferentially considered when performing frequency measurement and cell reselection on the basis of the frequency priority information. The UE may receive the frequency priority information by using system information or an RRC connection release message. Or, the UE may receive the frequency priority information from another RAT in inter-RAT cell reselection.

A non-access stratum (NAS) layer belongs to a higher layer of the RRC layer and serves to perform session management, mobility management, etc.

To manage mobility of the UE in the NAS layer, two states are defined, i.e., an EPS mobility management registered state (EMM-REGISTERED) and an EMM deregistered state (EMM-DEREGISTERED). These two states apply to the UE and the MME. Initially, the UE is in the EMM-DEREGISTERED. To access a network, the UE performs a procedure of registering to the network through an initial attach procedure. If the attach procedure is successfully completed, the UE and the MME enter the EMM-REGISTERED.

To manage a signaling connection between the UE and the EPC, two states are defined, i.e., an EPS connection management (ECM) idle state (ECM-IDLE) and an ECM connected state (ECM-CONNECTED). These two states apply to the UE and the MME. When a UE in the ECM-IDLE establishes an RRC connection with the E-UTRAN, the UE enters the ECM-CONNECTED. When an MME in the ECM-IDLE establishes an S1 connection with the E-UTRAN, the MME enters the ECM-CONNECTED. When the UE is in the ECM-IDLE, the E-UTRAN does not have context information of the UE. Therefore, the UE in the ECM-IDLE performs a UE-based mobility related procedure such as cell selection or reselection without having to receive a command of the network. On the other hand, when the UE is in the ECM-CONNECTED, mobility of the UE is managed by the command of the network. If a location of the UE in the ECM-IDLE becomes different from a location known to the network, the UE reports the location of the UE to the network through a tracking area update procedure.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

$$\text{Transmit power}=\text{TransmitPilot}-\text{RxPilot}+\text{ULInterference}+\text{Offset}+\text{SNRRequired}$$

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

System information is described. It may be referred to Section 5.2.2 of 3GPP TS 36.331 V8.7.0 (2009-09).

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

The system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type is as follows.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A cell type is as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

While in RRC_IDLE, the UE selects a RAT for communicating with a public land mobile network (PLMN) from which the UE intends to be served. Information about the PLMN and the RAT may be selected by a user of the UE. The user may use the information stored in a universal subscriber identity module (USIM).

A UE selects a highest cell among a measured BS and cells having higher quality than a predetermined value. This procedure is referred as an initial cell reselection, and performed by a UE turned on. The cell selection procedure will be described later. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed. The UE registers self information (i.e., *International mobile Subscribe* (MASI)) for being served by the network (i.e., paging). The UE does not register whenever the UE selects a cell. When the UE's own information about the network is different from information about the network provided from the system information, the UE performs the network registration procedure.

During RRC connection establishment procedure, a UE sends to a network an RRC connection request message for requesting an RRC connection. The network sends an RRC connection setup message in response to the RRC connection request. After receiving the RRC connection setup message, the UE enters an RRC connection mode. The UE sends to the network an RRC connection setup complete message used to confirm successful completion of the RRC connection.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection. In response to the RRC connection reconfiguration, the UE sends to the network an RRC connection reconfiguration complete message used to confirm successful completion of the RRC connection reconfiguration.

A procedure for selecting a cell by the UE is described. It may be referred to Section 5.2 of 3GPP TS 36.304 V8.5.0 (2009-03).

If the UE is turned on or is camped on a cell, the UE may perform procedures for selecting/reselecting a cell having suitable quality in order to receive a service. The UE in RRC_IDLE needs to be ready to receive the service through the cell by selecting the cell having suitable quality all the time. For example, the UE that has been just turned on must select the cell having suitable quality so as to be registered into a network. If the UE that has stayed in RRC_CONNECTED enters into RRC_IDLE, the UE must select a cell on which the UE itself is camped. As such, a process of selecting a cell satisfying a certain condition by the UE in order to stay in a service waiting state such as RRC_IDLE is called a cell selection. The cell selection is performed in a state that the UE does not currently determine a cell on which the UE itself is camped in RRC_IDLE, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having the highest priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g., cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Measurement and measurement report is described.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-RAT measurement. For example, RAT may include a GMS EDGE radio access network (GERAN) and a UMTS terrestrial radio access network (UTRAN) conforming to the 3GPP standard, and may also include a CDMA 2000 system conforming to the 3GPP2 standard.

For measurement report configuration, a UE receives measurement configuration information from a BS. A message including the measurement configuration information is referred to as a measurement configuration message. The UE performs measurement based on the measurement configuration information. If a measurement result satisfies a reporting condition included in the measurement configuration information, the UE reports the measurement result to the BS. A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g., number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

The BS can assign only one measurement object to the UE with respect to one frequency. Events for triggering measurement reporting are as follows. It may be referred to Section 5.5.4 of 3GPP TS 36.331 V8.5.0 (2009-03).

Event A1: Serving becomes better than threshold
Event A2: Serving becomes worse than threshold
Event A3: Neighbor becomes offset better than serving
Event A4: Neighbor becomes better than threshold
Event A5: Serving becomes worse than threshold1 and neighbor becomes better than threshold2
Event B1: Inter RAT neighbor becomes better than threshold
Event B2: Serving becomes worse than threshold1 and inter RAT neighbor becomes better than threshold2

If the measurement result of the UE satisfies the determined event, the UE transmits a measurement report message to the BS.

A PLMN is a network deployed and operated by mobile network operator(s). Each mobile network operator runs one or more PLMNs. Each PLMN can be identified with the mobile country code (MCC) and the mobile network code (MNC). The PLMN information of a cell is broadcast in the system information.

For PLMN selection, cell selection, and cell reselection, several types of PLMNs are considered by UE.
  Home PLMN (HPLMN): The PLMN whose MCC and the MNC matches the MCC and the MNC of the UE's IMSI.
  Equivalent HPLMN (EHPLMN): Any PLMN that is equivalent to HPLMN.
  Registered PLMN (RPLMN): The PLMN for which location registration is successful.
  Equivalent PLMN (EPLMN): Any PLMN that is equivalent to RPLMN.

Each mobile service subscriber has a subscription with a HPLMN. When the normal service is provided to UE by the HPLMN or the EHPLMN, the UE is not in a roaming state. On the other hand, when the service is provided to UE by the PLMN other than HPLMN/EPHPLN, the UE is in a roaming state, and the PLMN is called visited PLMN (VPLMN).

When UE is powered on, PLMN selection is triggered. For the selected PLMN, UE attempts to register the selected PLMN. If the registration is successful, the selected PLMN becomes RPLMN. Network can signal to the UE a list of PLMN for which the UE considers those PLMNs in the PLMN list equivalent to its RPLMN. The PLMN equivalent to RPLMN is called EPLMN. The UE that registered with network should be reachable by the network at any time. If the UE is in ECM-CONNECTED (equivalently RRC_CONNECTED), the network is aware of the cell the UE is being served. However, while the UE is in ECM-IDLE (equivalently RRC_IDLE), the context of the UE is not available at the eNB but stored in the MME. In this case, the location of the UE in ECM-IDLE is only known to the MME at the granularity of a list of tracking Areas (TAs).

Wi-Fi protocols are described. Wi-Fi is a popular technology that allows an electronic device to exchange data wirelessly (using radio waves) over a computer network, including high-speed Internet connections. The Wi-Fi Alliance defines Wi-Fi as any "wireless local area network (WLAN) products that are based on the IEEE 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or hotspot) has a range of about 20 meters (65 feet) indoors and a greater range outdoors. Hotspot coverage can comprise an area as small as a single room with walls that block radio waves or as large as many square miles—this is achieved by using multiple overlapping access points.

"Wi-Fi" is a trademark of the Wi-Fi Alliance and the brand name for products using the IEEE 802.11 family of standards. Only Wi-Fi products that complete Wi-Fi Alliance interoperability certification testing successfully may use the "Wi-Fi CERTIFIED" designation and trademark.

Wi-Fi has had a checkered security history. Its earliest encryption system, wired equivalent privacy (WEP), proved easy to break. Much higher quality protocols, Wi-Fi protected access (WPA) and WPA2, were added later. However, an optional feature added in 2007, called Wi-Fi protected setup (WPS), has a flaw that allows a remote attacker to recover the router's WPA or WPA2 password in a few hours on most implementations. Some manufacturers have recommended turning off the WPS feature. The Wi-Fi Alliance has since updated its test plan and certification program to ensure all newly certified devices resist brute-force AP PIN attacks.

The 802.11 family consist of a series of half-duplex over-the-air modulation techniques that use the same basic protocol. The most popular are those defined by the 802.11b and 802.11g protocols, which are amendments to the original standard. 802.11-1997 was the first wireless networking standard, but 802.11b was the first widely accepted one, followed by 802.11g and 802.11n. 802.11n is a new multi-streaming modulation technique. Other standards in the family (c-f, h, j) are service amendments and extensions or corrections to the previous specifications.

802.11b and 802.11g use the 2.4 GHz ISM band, operating in the United States under Part 15 of the US Federal Communications Commission Rules and Regulations. Because of this choice of frequency band, 802.11b and g equipment may occasionally suffer interference from microwave ovens, cordless telephones and Bluetooth devices. 802.11b and 802.11g control their interference and susceptibility to interference by using direct-sequence spread spectrum (DSSS) and OFDM signaling methods, respectively. 802.11a uses the 5 GHz U-NII band, which, for much of the world, offers at least 23 non-overlapping channels rather than the 2.4 GHz ISM frequency band, where adjacent channels overlap. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

Figure 5:
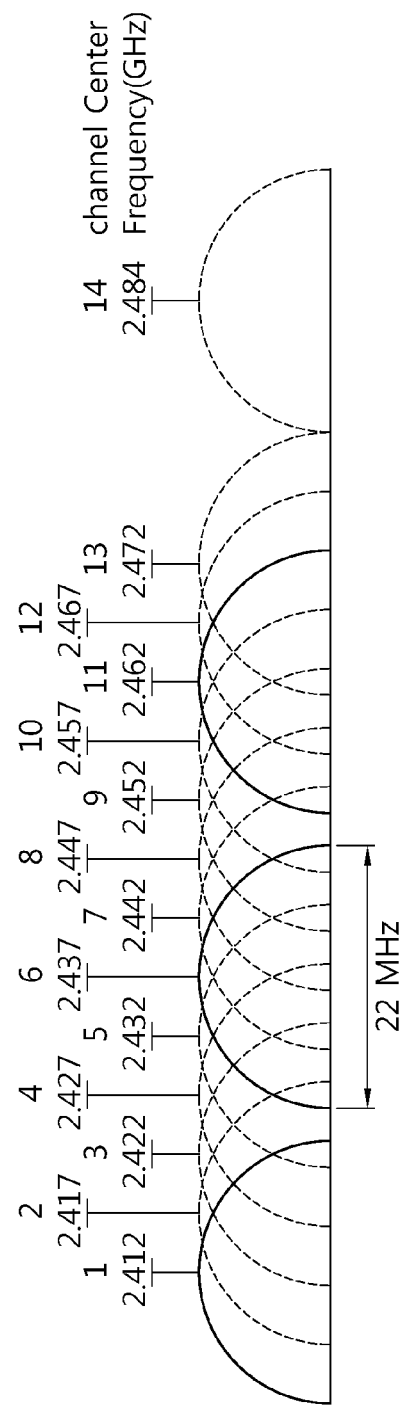
FIG. 5 shows a graphical representation of Wi-Fi channels in 2.4 GHz band.

FIG. 5 shows a graphical representation of Wi-Fi channels in 2.4 GHz band.

802.11 divides each of the above-described bands into channels, analogous to the way radio and TV broadcast bands are sub-divided. For example the 2.4000-2.4835 GHz band is divided into 13 channels spaced 5 MHz apart, with channel 1 centered on 2.412 GHz and 13 on 2.472 GHz (to which Japan added a $14^{th}$ channel 12 MHz above channel 13 which was only allowed for 802.11b). 802.11b was based on DSSS with a total channel width of 22 MHz and did not have steep skirts. Consequently only three channels do not overlap. Even now, many devices are shipped with channels 1, 6 and 11 as preset options even though with the newer 802.11g standard there are four non-overlapping channels—1, 5, 9 and 13. There are now four because the OFDM modulated 802.11g channels are 20 MHz wide.

Availability of channels is regulated by country, constrained in part by how each country allocates radio spectrum to various services. At one extreme, Japan permits the use of all 14 channels for 802.11b, while other countries such as Spain initially allowed only channels 10 and 11, and France only allowed 10, 11, 12 and 13. They now allow channels 1 through 13. North America and some Central and South American countries allow only 1 through 11.

In addition to specifying the channel centre frequency, 802.11 also specifies a spectral mask defining the permitted power distribution across each channel. The mask requires the signal be attenuated a minimum of 20 dB from its peak amplitude at ±11 MHz from the centre frequency, the point at which a channel is effectively 22 MHz wide. One consequence is that stations can only use every fourth or fifth channel without overlap, typically 1, 6 and 11 in the Americas, and in theory, 1, 5, 9 and 13 in Europe although 1, 6, and 11 is typical there too. Another is that channels 1-13 effectively require the band 2.401-2.483 GHz, the actual allocations being, for example, 2.400-2.4835 GHz in the UK, 2.402-2.4735 GHz in the US, etc.

Most Wi-Fi devices default to regdomain 0, which means least common denominator settings, i.e., the device will not transmit at a power above the allowable power in any nation, nor will it use frequencies that are not permitted in any nation.

The regdomain setting is often made difficult or impossible to change so that the end users do not conflict with local regulatory agencies such as the Federal Communications Commission.

Current 802.11 standards define "frame" types for use in transmission of data as well as management and control of wireless links.

Frames are divided into very specific and standardized sections. Each frame consists of a MAC header, payload and frame check sequence (FCS). Some frames may not have the payload. The first two bytes of the MAC header form a frame control field specifying the form and function of the frame. The frame control field is further subdivided into the following sub-fields:

Protocol Version: two bits representing the protocol version. Currently used protocol version is zero. Other values are reserved for future use.

Type: two bits identifying the type of WLAN frame. Control, data and management are various frame types defined in IEEE 802.11.

Sub Type: Four bits providing addition discrimination between frames. Type and Sub type together to identify the exact frame.

ToDS and FromDS: Each is one bit in size. They indicate whether a data frame is headed for a distribution system. Control and management frames set these values to zero. All the data frames will have one of these bits set. However communication within an independent basic service set (IBSS) network always set these bits to zero.

More Fragments: The More Fragments bit is set when a packet is divided into multiple frames for transmission. Every frame except the last frame of a packet will have this bit set.

Retry: Sometimes frames require retransmission, and for this there is a Retry bit which is set to one when a frame is resent. This aids in the elimination of duplicate frames.

Power Management: This bit indicates the power management state of the sender after the completion of a frame exchange. Access points are required to manage the connection and will never set the power saver bit.

More Data: The More Data bit is used to buffer frames received in a distributed system. The access point uses this bit to facilitate stations in power saver mode. It indicates that at least one frame is available and addresses all stations connected.

WEP: The WEP bit is modified after processing a frame. It is toggled to one after a frame has been decrypted or if no encryption is set it will have already been one.

Order: This bit is only set when the "strict ordering" delivery method is employed. Frames and fragments are not always sent in order as it causes a transmission performance penalty.

The next two bytes are reserved for the Duration ID field. This field can take one of three forms: Duration, Contention-Free Period (CFP), and Association ID (AID).

An 802.11 frame can have up to four address fields. Each field can carry a MAC address. Address 1 is the receiver, Address 2 is the transmitter, Address 3 is used for filtering purposes by the receiver.

The Sequence Control field is a two-byte section used for identifying message order as well as eliminating duplicate frames. The first 4 bits are used for the fragmentation number and the last 12 bits are the sequence number.

An optional two-byte Quality of Service control field which was added with 802.11e.

The Frame Body field is variable in size, from 0 to 2304 bytes plus any overhead from security encapsulation and contains information from higher layers.

The frame check sequence (FCS) is the last four bytes in the standard 802.11 frame. Often referred to as the cyclic redundancy check (CRC), it allows for integrity check of retrieved frames. As frames are about to be sent the FCS is calculated and appended. When a station receives a frame it can calculate the FCS of the frame and compare it to the one received. If they match, it is assumed that the frame was not distorted during transmission.

Management frames allow for the maintenance of communication. Some common 802.11 subtypes include:

Authentication frame: 802.11 authentication begins with the wireless network interface controller (WNIC) sending an authentication frame to the access point containing its identity. With an open system authentication the WNIC only sends a single authentication frame and the access point responds with an authentication frame of its own indicating acceptance or rejection. With shared key authentication, after the WNIC sends its initial authentication request it will receive an authentication frame from the access point containing challenge text. The WNIC sends an authentication frame containing the encrypted version of the challenge text to the access point. The access point ensures the text was encrypted with the correct key by decrypting it with its own key. The result of this process determines the WNIC's authentication status.

Association request frame: sent from a station it enables the access point to allocate resources and synchronize. The frame carries information about the WNIC including supported data rates and the SSID of the network the station wishes to associate with. If the request is accepted, the access point reserves memory and establishes an association ID for the WNIC.

Association response frame: sent from an access point to a station containing the acceptance or rejection to an association request. If it is an acceptance, the frame will contain information such an association ID and supported data rates.

Beacon frame: Sent periodically from an access point to announce its presence and provide the SSID, and other parameters for WNICs within range.

Deauthentication frame: sent from a station wishing to terminate connection from another station.

Disassociation frame: sent from a station wishing to terminate connection. It's an elegant way to allow the access point to relinquish memory allocation and remove the WNIC from the association table.

Probe request frame: sent from a station when it requires information from another station.

Probe response frame: sent from an access point containing capability information, supported data rates, etc., after receiving a probe request frame.

Reassociation request frame: A WNIC sends a reassociation request when it drops from range of the currently associated access point and finds another access point with a stronger signal. The new access point coordinates the forwarding of any information that may still be contained in the buffer of the previous access point.

Reassociation response frame: sent from an access point containing the acceptance or rejection to a WNIC reassociation request frame. The frame includes information required for association such as the association ID and supported data rates.

Control frames facilitate in the exchange of data frames between stations. Some common 802.11 control frames include:

Acknowledgement (ACK) frame: After receiving a data frame, the receiving station will send an ACK frame to the sending station if no errors are found. If the sending station doesn't receive an ACK frame within a predetermined period of time, the sending station will resend the frame.

Request to send (RTS) frame: The RTS and CTS frames provide an optional collision reduction scheme for access points with hidden stations. A station sends a RTS frame to as the first step in a two-way handshake required before sending data frames.

Clear to send (CTS) frame: A station responds to an RTS frame with a CTS frame. It provides clearance for the requesting station to send a data frame. The CTS provides collision control management by including a time value for which all other stations are to hold off transmission while the requesting stations transmits.

Data frames carry packets from web pages, files, etc., within the body, using RFC 1042 encapsulation and EtherType numbers for protocol identification.

The BSS is the basic building block of an 802.11 wireless LAN. In infrastructure mode, a single AP together with all associated stations (STAs) is called a BSS. This is not to be confused with the coverage of an access point, which is called basic service area (BSA). The access point acts as a master to control the stations within that BSS. The simplest BSS consists of one access point and one station. In ad hoc mode, a set of synchronized stations (one of which acts as master) forms a BSS.

With 802.11, it is possible to create an ad-hoc network of client devices without a controlling access point; the result is called an IBSS.

Each BSS is uniquely identified by what's called a basic service set identification (BSSID). For a BSS operating in infrastructure mode, the BSSID is the MAC address of the wireless access point (WAP). For an IBSS, the BSSID is a locally administered MAC address generated from a 46-bit random number. The individual/group bit of the address is set to 0 (individual). The universal/local bit of the address is set to 1 (local).

A BSSID with a value of all is is used to indicate the broadcast BSSID, which may only be used during probe requests.

An extended service set (ESS) is a set of one or more interconnected BSSs and integrated local area networks that appear as a single BSS to the logical link control layer at any station associated with one of those BSSs. The BSSs may work on the same channel, or work on different channels to boost aggregate throughput.

Each ESS is identified by a service set identifier (SSID). For an IBSS, the SSID is chosen by the client device that starts the network, and broadcasting of the SSID is performed in a pseudo-random order by all devices that are members of the network. The maximum length of the SSID is currently 32 bytes long.

The UE may receive the assistance information, such as thresholds, 3GPP access network cell identifiers, for interworking between the 3GPP access network and the non-3GPP access network from the network through a dedicated signaling and/or broadcast signaling. The assistance information received through the dedicated signaling (hereinafter, dedicated assistance information) may be used to steer traffic of specific UEs which generates high load in the 3GPP access network. A UE to which the radio access network (RAN) gave aggressive dedicated thresholds (i.e., promoting steering from the 3GPP access network to the non-3GPP access network) would steer the traffic to the non-3GPP access network and then may become inactive in the 3GPP access network. Due to the inactivity in the 3GPP access network, the UE would enter RRC_IDLE. However, if the UE applies the assistance information received through the broadcast signaling (hereinafter, broadcast assistance information) right after entering RRC_IDLE, it would be possible that the traffic of the UE is steered back to the 3GPP access network again by the assistance information received through the broadcast signaling. That is, it may cause a ping-pong problem due to the dedicated assistance information and the broadcast assistance information.

In order to avoid the ping-pong problem described above, a method for applying assistance information for traffic steering between a 3GPP access network and a non-3GPP access network, received through a dedicated signaling and a broadcast signaling, according to an embodiment of the present invention is described. According to the embodiment of the present invention, a UE may apply dedicated assistance information for a specific period of time even after the UE enters RRC_IDLE in order to avoid the ping-pong problem. By utilizing the dedicated assistance information by the UE even after entering RRC_IDLE for a specific period of time, the operator can effectively steer the traffic of UEs in RRC_IDLE as well as UEs in RRC_CONNECTED between the 3GPP access network and the non-3GPP access network.

While the UE is staying in RRC_CONNECTED, the UE may be given the assistance information for traffic steering between the 3GPP access network and non-3GPP access network through the dedicated signaling at any point of time. The dedicated assistance information may include validity information. The validity information will be described later. The dedicated assistance information is considered as valid when a validity condition by the validity information is met. If the dedicated assistance information is considered as valid, the UE applies the dedicated assistance information. Otherwise, the UE applies the assistance information received through the broadcast signaling.

The UE may be given the assistance information through any downlink dedicated signaling, such as an RRC connection release message or an RRC connection reconfiguration message, etc. If the UE in RRC_IDLE has valid dedicated assistance information, the UE may stop reading system information regarding traffic steering between the 3GPP access network and the non-3GPP access network even if the network broadcasts the assistance information for traffic steering through the broadcast signaling. If the validity condition by the validity information is not met any more (e.g., a validity timer expires) during RRC_IDLE, the UE in RRC_IDLE may read the system information regarding traffic steering between the 3GPP access network and the non-3GPP access network.

The assistance information may include at least one of followings.

- Thresholds regarding the 3GPP access network: For frequency division duplex (FDD), the thresholds regarding the 3GPP access network may include LTE reference signal received power (RSRP) threshold and/or UMTS common pilot channel (CPICH) received signal code power (RSCP) threshold. Alternatively, for FDD, the thresholds regarding the 3GPP access network may include LTE reference signal received quality (RSRQ) threshold and/or UMTS CPICH Ec. For time division duplex (TDD), the thresholds regarding the 3GPP access network may include UMTS primary common control physical channel (PCCPCH) RSCP threshold. The UE may perform traffic steering between the 3GPP access network and the non-3GPP access network after comparing the threshold and measured signal level.
- Thresholds regarding the non-3GPP access network: The thresholds regarding the non-3GPP access network may include at least one of WLAN channel utilization in the BSS load, available WLAN DL and UL backhaul data rate or WLAN signal power/quality (e.g., received channel power indicator (RCPI), received signal to noise indicator (RSNI), received signal strength indicator (RSSI)). The UE may perform traffic steering between the 3GPP access network and the non-3GPP access network after comparing the threshold and the acquired load information.
- Identifiers of the non-3GPP access network
- Traffic routing information: The traffic routing information may include at least one of offloadable bearer information/Non-offloadable bearer information, offloadable access point name (APN) information/Non-offloadable APN information, or offloadable IP flow information/Non-offloadable IP flow information.
- Validity condition information: The validity condition information may include at least one of time value during which the assistance information is considered as valid, or area information in which the assistance information is considered as valid.

The validity information is described in detail. As described above, the validity information may include timer based validity information and/or area based validity information.

At first, timer based validity information is described. The dedicated assistance information may be considered as valid for a validity time indicated by the validity information (e.g., x seconds/minutes) since the dedicated assistance information is received. That is, the timer may start with the configured/fixed value when the UE receives the dedicated assistance information. Even if the UE enter RRC_IDLE, the UE may consider the dedicated assistance information as valid if the timer is still running Even if a serving cell is changed due to e.g., handover or a cell (re)selection, the dedicated assistance information may be still considered as valid until the timer expires.

Alternatively, the dedicated assistance information is considered as valid during RRC_CONNECTED unless the dedicated assistance information is newly provided. Upon entering RRC_IDLE, the dedicated assistance information is considered as valid according to the validity information. That is, the timer may start with the configured/fixed value upon entering RRC_IDLE before successfully establishing RRC connection. The UE may apply the dedicated assistance information upon entering RRC_IDLE, until timer with the configured/fixed expires since the UE enters RRC_IDLE. Even if a serving cell is changed, the dedicated assistance information may be still considered as valid until the timer expires.

Alternatively, the dedicated assistance information may be considered as valid during this RRC connection. Alternatively, the dedicated assistance information may be considered as valid during RRC_IDLE afterwards. The network may indicate via the dedicated signaling whether the dedicated assistance information is valid or not during RRC_IDLE.

At second, area based validity information is described. The dedicated assistance information may be considered as valid only within in a current cell. If a serving cell is changed due to e.g., handover or cell (re)selection, the dedicated assistance information may be considered as invalid. Alternatively, the dedicated assistance information may be considered as valid within a list of cells that are also informed to UEs. Alternatively, the dedicated assistance information may be considered as valid within a list of tracking area codes that are also informed to UEs. The list of tracking area codes may be different from the normal list of tracking area codes, which is used to prevent too frequent UE location updates.

The timer based validity information may be confined within the area based validity information. If the UE moves out of the validity area indicated by the area based validity information, the timer may automatically expire. Or, it is possible that the network configures the UE about which alternative above should be applied.

If the UE determines that the dedicated assistance information is not valid, the UE may release the dedicated assistance information and clear the timer.

When the dedicated assistance information is not considered as valid any more, the UE may notify the network of the stored dedicated assistance information and expiring of the dedicated assistance information. And, the UE may remove the stored dedicated assistance information. If the UE is in RRC_IDLE when the dedicated assistance information is not considered as valid any more, the UE may establish the RRC connection. The above information may be transmitted to the network using any UL message including an RRC connection establishment message. Alternatively, if the UE establishes the RRC connection before the expiry of validity condition of the dedicated assistance information, the UE may notify the network of the dedicated assistance information and the validity information included in the dedicated assistance information. Upon receiving the dedicated assistance information and the validity information, the network may indicate whether to remove/apply the stored dedicated assistance information. Alternatively, after reporting, the UE may autonomously remove the stored dedicated assistance information.

Meanwhile, when the UE performs inter-cell/eNB handover, the source (e)NB may forward the dedicated assistance information for the UE to the target cell/(e)NB. If the UE performs the (re)selection while the dedicated assistance information is considered as valid, the UE may establish RRC connection upon cell (re)selection and inform the network of the valid dedicated assistance information.

Figure 6:
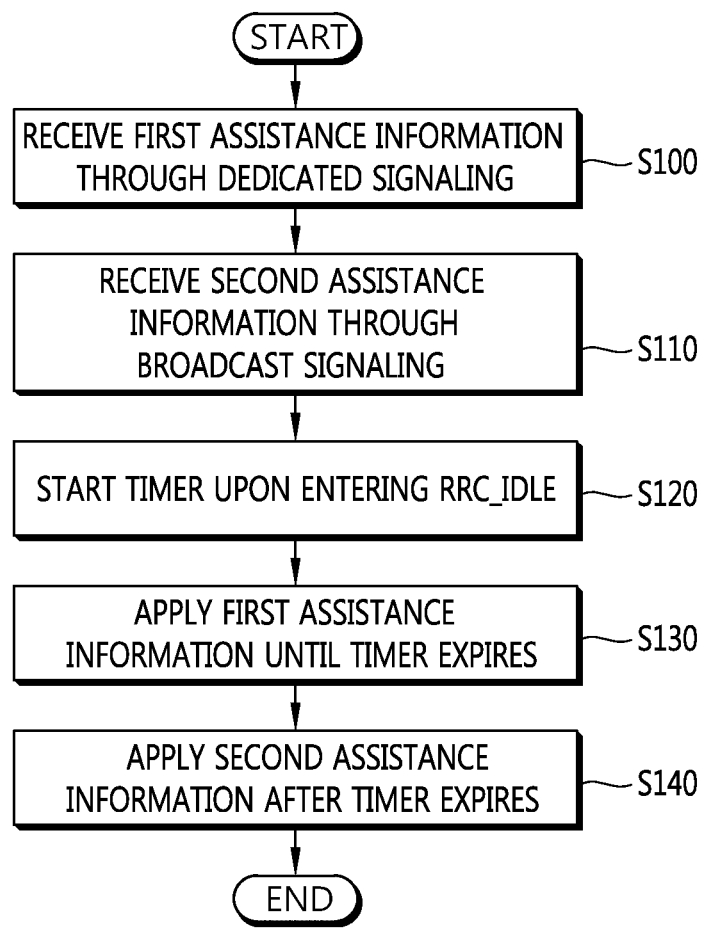
FIG. 6 shows an example of a method for applying assistance information for traffic steering according to an embodiment of the present invention.

FIG. 6 shows an example of a method for applying assistance information for traffic steering according to an embodiment of the present invention.

In step S100, the UE receives first assistance information for traffic steering between through a dedicated signaling. In step S110, the UE receives second assistance information for traffic steering through a broadcast signaling. In step S120, the UE starts a timer upon entering an idle mode. In step S130, the UE applies the first assistance information received through the dedicated signaling until the timer expires. When the timer expires, the UE releases the first assistance information received through the dedicate signaling. In step S140, the UE applies the second assistance information received through the broadcast signaling after the timer expires.

Figure 7:
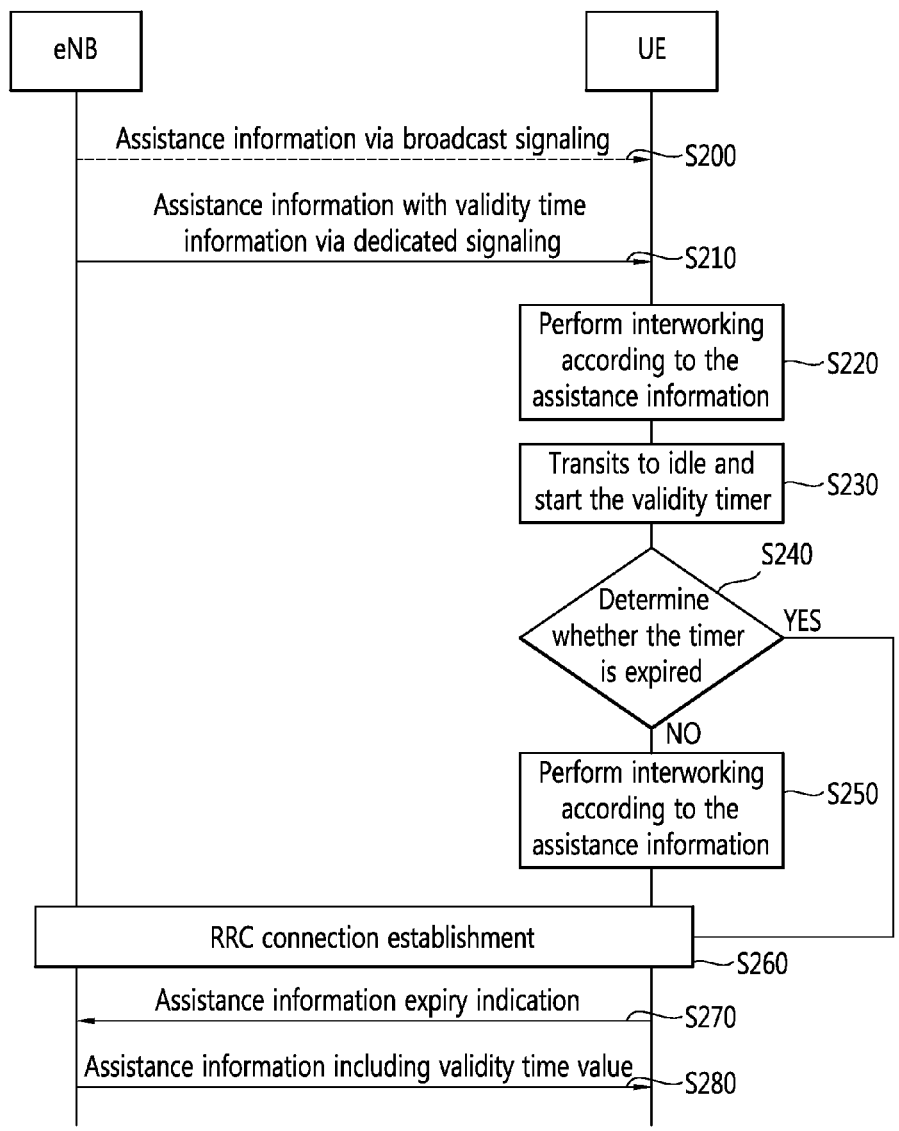
FIG. 7 shows an example of a method for applying assistance information for traffic steering according to another embodiment of the present invention.

FIG. 7 shows an example of a method for applying assistance information for traffic steering according to another embodiment of the present invention.

In step S200, the eNB may transmit the broadcast assistance information for traffic steering between the 3GPP access network and the non-3GPP access network. Upon receiving the broadcast assistance information, the UE may apply the broadcast assistance information.

In step S210, while the UE is in RRC_CONNECTED, the UE is given the dedicated assistance information for traffic steering between the 3GPP access network and the non-3GPP access network, with the validity timer value.

In step S220, during RRC_CONNECTED, the UE performs traffic steering based on the dedicated assistance information.

Due to traffic steering from the 3GPP access network to the non-3GPP access network, there is no active traffic in the 3GPP access network so that the UE transits to RRC_IDLE. In step S230, upon transiting to RRC_IDLE, the UE sets the timer with the received validity timer value and initiates the timer.

In step S240, during RRC_IDLE, the UE determines whether the dedicated assistance information is still valid. That is, if the timer is still running, the UE determines that the dedicated assistance information is valid. In step S250, if there is valid dedicated assistance information, the UE performs traffic steering based on the dedicated assistance information.

In step S260, if the dedicated assistance information is not valid any more, the UE in RRC_IDLE establishes the RRC connection. That is, if the timer expires, the UE in RRC_IDLE establishes the RRC connection. And in step S270, the UE notifies the eNB of the dedicated assistance information and expiring of the dedicated assistance information. And, the UE may remove the dedicated assistance information.

In step S280, the eNB may provide new dedicated assistance information to the UE. Then, the UE may receive and apply the new dedicated assistance information.

Figure 8:
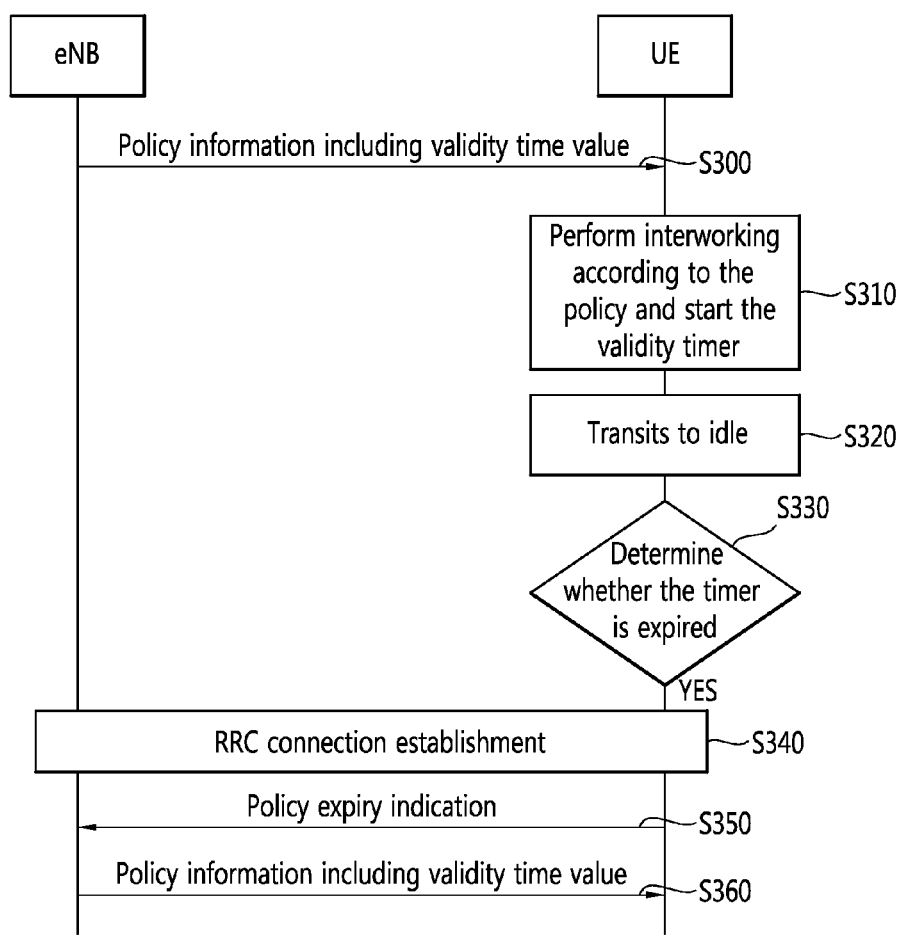
FIG. 8 shows an example of a method for applying assistance information for traffic steering according to another embodiment of the present invention.

FIG. 8 shows an example of a method for applying assistance information for traffic steering according to another embodiment of the present invention.

In step S300, while the UE is in RRC_CONNECTED, the UE is given the assistance/policy information for traffic steering between the 3GPP access network and non-3GPP access network through dedicated signaling at any point of time. The dedicated assistance information may be valid within validity scope. If the assistance information is also provided with broadcast signaling (e.g., through system information), the UE may read the broadcast assistance information. However, the UE may override broadcasted assistance information with the dedicated assistance information. Otherwise, the UE may apply the broadcast assistance information.

The UE may be given the dedicated assistance information when the UE transits from RRC_CONNECTED to RRC_IDLE. The dedicated assistance information may be included in an RRC connection release message or an RRC connection reconfiguration message. Further, the validity scope may be applied regardless of change of RRC state. In other words, even if the UE transits from RRC_IDLE to RRC_CONNECTED or vice versa, the UE may keep the dedicated assistance information. When the eNB provides the dedicated assistance information, the eNB may provide the indication indicating that the dedicated assistance information is applicable to next RRC_IDLE. In this case, the UE may perform traffic steering based on the dedicated assistance information when the UE transits to next RRC_IDLE as well as when the UE stays in RRC_CONNECTED. Otherwise, the UE performs traffic steering based on the dedicated assistance information only when the UE stays in RRC_CONNECTED. Further, the broadcast assistance information may be only applied to the UE when the UE stays in RRC_IDLE.

In step S310, after receiving the dedicated assistance information, the UE performs the traffic steering according to the dedicated assistance information.

In step S320, the UE transits to RRC_IDLE.

In step S330, during staying in RRC_IDLE and RRC_CONNECTED, the UE determines whether the dedicated assistance information is still valid.

In step S340, if the validity of the dedicated assistance information expires during RRC_IDLE, the UE establishes the RRC connection. And, in step S350, the UE notifies the network of the dedicated assistance information and expiring of the dedicated assistance information. The above information may be transmitted to the network during RRC connection establishment procedure. And the UE may remove the stored dedicated assistance information.

If the UE establishes the RRC connection before the validity of the dedicated assistance information, the UE may notify the network of the validity information of the dedicated assistance information. If the validity of the dedicated assistance information expires during RRC_CONNECTED, the UE may notify the network of the dedicated assistance information and expiring of the dedicated assistance information. If the UE establishes the RRC connection before the expiry of the dedicated assistance information, the UE may remove the stored dedicated assistance information even though the UE considers the dedicated information as still valid. In this case, the UE in RRC_CONNECTED may not perform traffic steering until the network newly provides the dedicated assistance information if the broadcasted assistance information is only applied to the UE in RRC_IDLE.

In step S360, the network may provide updated dedicated assistance information to the UE. Then, the UE may receive and apply the updated dedicated assistance information.

When the UE performs inter-eNB handover, the source (e)NB may forward the dedicated assistance information to the target (e)NB. The validity is kept on regardless of RRC state of the UE. If the UE performs the (re)selection while the dedicated assistance information is valid, the UE may establish RRC connection and inform the network of the valid dedicated assistance information. If the UE performs the (re)selection while the dedicated assistance information is valid, the UE may clear the valid dedicated assistance information.

Figure 9:
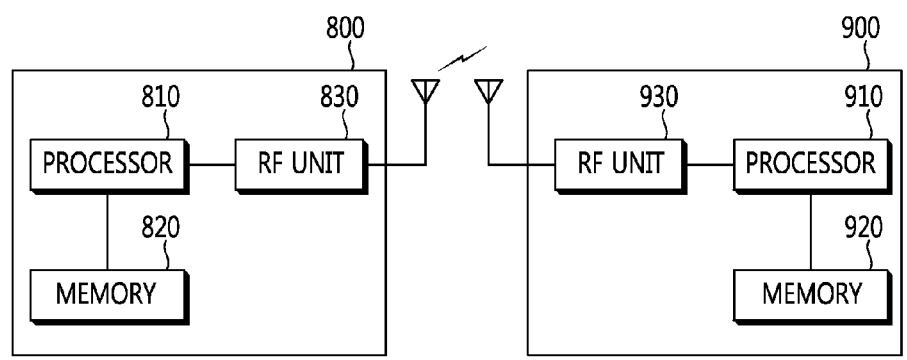
FIG. 9 shows a wireless communication system to implement an embodiment of the present invention.

FIG. 9 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for applying, by a user equipment (UE), assistance information for traffic steering between a 3rd generation partnership project (3GPP) access network and a non-3GPP access network in a wireless communication system, the method comprising:
   receiving first assistance information for traffic steering through a dedicated signaling from an eNodeB (eNB);
   receiving second assistance information for traffic steering through a broadcast signaling from the eNB;
   starting a timer upon entering an idle mode;
   applying the first assistance information received through the dedicated signaling while the timer is running;
   stopping the timer when a serving cell is changed or the UE establishes a radio resource control (RRC) connection; and
   upon stopping the timer, releasing the first assistance information and applying the second assistance information received through the broadcast signaling.

2. The method of claim 1, wherein the first assistance information includes a time value for the timer which indicates a period of time during which the first assistance information is valid.

3. The method of claim 1, wherein the serving cell is changed when handover, cell selection or cell reselection is performed.

4. The method of claim 1, wherein the first assistance information includes area information indicating an area in which the first assistance information is valid.

5. The method of claim 1, wherein the first assistance information includes at least one of thresholds regarding the 3GPP access network, thresholds regarding the non-3GPP access network, identifiers of the non-3GPP access network, or traffic routing information.

6. The method of claim 1, wherein the second assistance information includes at least one of thresholds regarding the 3GPP access network, thresholds regarding the non-3GPP access network, identifiers of the non-3GPP access network, or traffic routing information.

7. The method of claim 1, wherein the first assistance information is received via a radio resource control (RRC) connection reconfiguration message.

8. The method of claim 1, wherein the second assistance information is received via system information.

9. The method of claim 1, wherein the applying the first assistance information includes performing traffic steering from the 3GPP access network to the non-3GPP access network or from the non-3GPP access network to the 3GPP access network based on the first assistance information.

10. The method of claim 1, wherein the applying the second assistance information includes performing traffic steering from the 3GPP access network to the non-3GPP access network or from the non-3GPP access network to the 3GPP access network based on the second assistance information.

11. The method of claim 1, further comprising:
    establishing an RRC connection with the eNB after the timer expires; and
    transmitting the first assistance information and the expiry of the first assistance information upon establishing the RRC connection with the eNB.

12. A user equipment (UE) in a wireless communication system, the UE comprising:
    a radio frequency (RF) unit for transmitting or receiving a radio signal; and a processor coupled to the RF unit, and configured to:
receive first assistance information for traffic steering between a 3rd generation partnership project (3GPP) access network and a non-3GPP access network through a dedicated signaling from an eNodeB (eNB);
receive second assistance information for traffic steering through a broadcast signaling from the eNB;
start a timer upon entering an idle mode;
apply the first assistance information received through the dedicated signaling while the timer is running;
stop the timer when a serving cell is changed or the UE establishes a radio resource control (RRC) connection; and
upon stopping the timer, release the first assistance information and apply the second assistance information received through the broadcast signaling.

* * * * *